United States Patent [19]
Granderath et al.

[11] 3,874,838
[45] Apr. 1, 1975

[54] MOLDING APPARATUS

[75] Inventors: Josef Granderath; Guenter Helmrich, both of Grevenbroich, Germany

[73] Assignee: Vereinigte Aluminum-Werke Aktiengesellschaft, Bonn, Germany

[22] Filed: Dec. 21, 1972

[21] Appl. No.: 317,357

[30] Foreign Application Priority Data
Dec. 24, 1971 Germany............................ 2164487

[52] U.S. Cl................. 425/408, 425/803, 425/425
[51] Int. Cl. ............................................. B29c 3/00
[58] Field of Search .... 425/408, 436, 450, DIG. 30, 425/802, 803, 425; 249/48, 160

[56] References Cited
UNITED STATES PATENTS

| | | | |
|---|---|---|---|
| 445,284 | 1/1891 | Egge | 425/408 |
| 1,543,288 | 6/1925 | Laukhoff | 425/408 |
| 2,127,404 | 8/1938 | Gullich | 425/408 X |
| 3,003,188 | 10/1961 | Weiss | 425/385 X |
| 3,255,279 | 6/1966 | Smith | 425/408 X |
| 3,421,184 | 1/1969 | Ford et al. | 425/408 |

*Primary Examiner*—Robert L. Spicer, Jr.
*Attorney, Agent, or Firm*—Michael S. Striker

[57] ABSTRACT

An apparatus for molding shaped articles includes a lower and an upper mold section which together define a horizontally elongated internal mold cavity. The lower mold section has a downwardly concave inner surface which extends over a portion of arc greater than 180° but substantially smaller than 360°. The upper mold section has an upwardly concave inner surface which extends over the remaining portion of arc. These two surfaces together bound the mold cavity.

7 Claims, 1 Drawing Figure

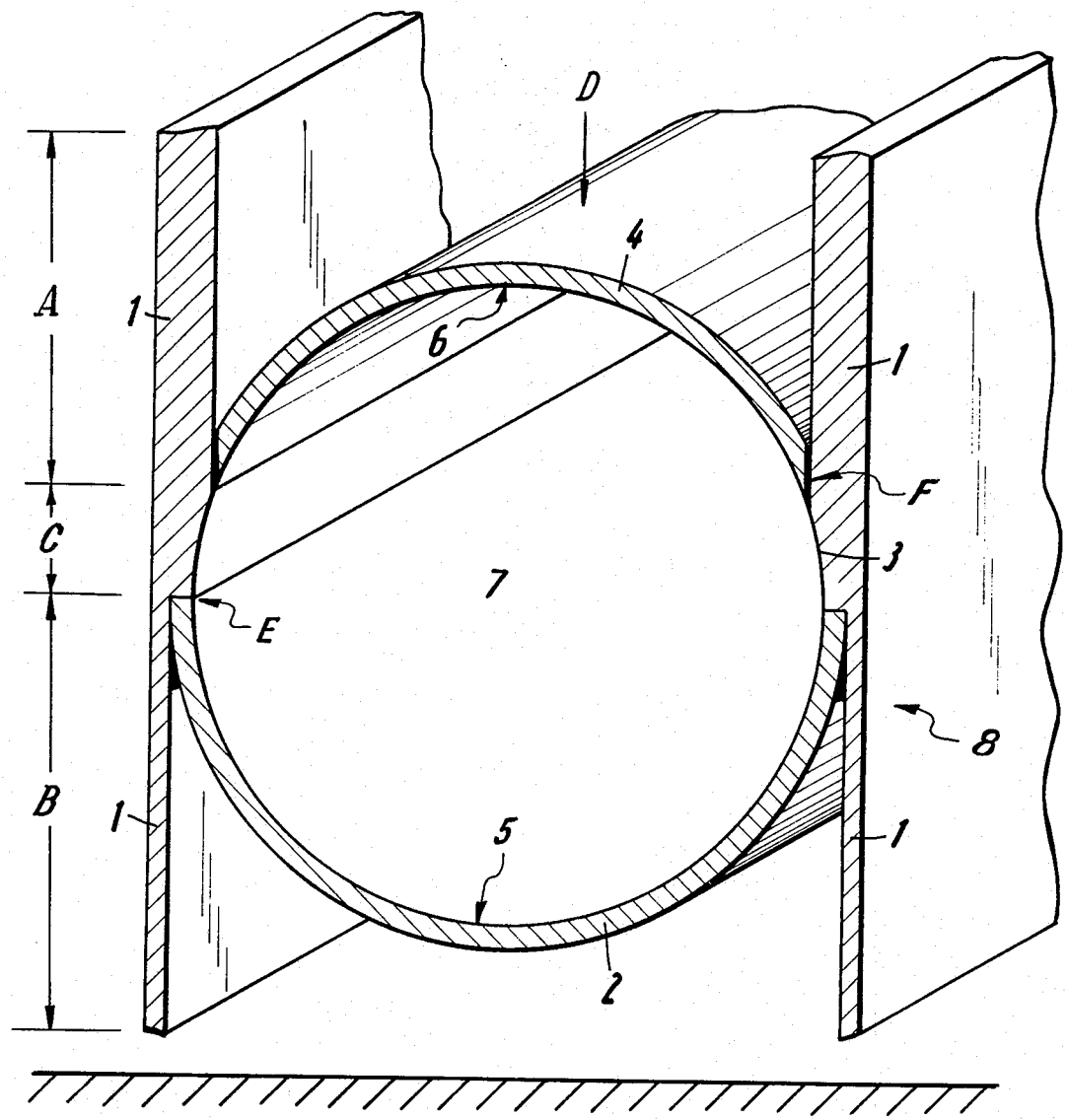

MOLDING APPARATUS

BACKGROUND OF THE INVENTION

The invention is concerned with the molding of carbon and ceramic articles, particularly electrodes for electric furnaces, and, more specifically, with an apparatus for molding such articles. In particular, the invention relates to apparatus for molding cylindrical articles which are molded under pressure while, at the same time, being subjected to vibrations.

The molding of such articles from particulate materials in an enclosed, one-piece, cylindrical mold, wherein the axis of the cylinder extends vertically, is not possible for various reasons. Such cylindrical articles must frequently be quite large, and especially carbon electrodes are often required to have a length of at least 2 meters in order to be suitable for use in electric-arc furnaces. Since the filling space or height of the cavity in which the particulate material to be molded is placed must be approximately twice the height of the finished article, the use of a vertically oriented cylindrical mold for the vibrational molding of such articles in itself leads to a height requirement of 4 meters for the mold. This is aside from the additional height required for the apparatus necessary to produce pressure in the mold, i.e., the apparatus for shifting the ram. Furthermore, compression of the particulate material is due to the pressure exerted by the ram at the top of the mold and the simultaneous pressure exerted on it by the bottom surface of the vibrating mold. As a result of the requisite length of the molded article, the intermediate regions thereof will not receive the necessary compression. In other words, the density of the layers in horizontal direction, i.e. in direction normal to the cylinder axis, will vary. This is accompanied by variations in conductivity which, particularly for carbon electrodes to be used in electric-arc furnaces, are very unfavorable.

SUMMARY OF THE INVENTION

Accordingly, it is an object of the invention to overcome the above disadvantages.

Another object of the invention is to provide an apparatus wherein articles may be molded without the formation of seams or flashings.

A further object of the invention is to provide a vibrating mold wherein cylindrical articles of uniform crosssection may be molded without the formation of seams.

An additional object of the invention is to provide a vibrating mold in which the various mold sections will not be damaged by the vibrations.

The problems of the prior art can be overcome by using a horizontally oriented vibrating mold, i.e. a mold wherein the cylinder axis lies in a horizontal plane. However, if one were to use two semi-cylindrical mold sections which are moved towards one another during compression of the particulate material but the surfaces of which do not touch after the compression is complete (to avoid marring of the surfaces), then a seam or flashing will be formed in the molded article in the region between these surfaces. By using this type of apparatus, the cross-section of the molded cylindrical article will be neither circular nor oval-shaped and the formation of the aforementioned seam cannot be avoided. The mating surfaces of the mold sections must, on the other hand, not touch one another since the mold vibrates which would lead to marring of the mating surfaces.

In accordance with the above and other objects which will become apparent, the invention overcomes the outlined problems by providing an apparatus for molding shaped articles which comprises a lower and an upper mold section. These two sections together define an internal mold cavity. The lower mold section has a downwardly concave inner surface extending over a portion of arc greater than 180° but smaller than 360°. The upper mold section has an upwardly concave inner surface which extends over the remaining portion of arc. These surfaces together bound the mold cavity.

Investigations have shown that, by using an apparatus as described above, the molding or forming of round articles by means of vibrations imparted to the mold can be accomplished without the formation of seams. Such articles may include electrodes for electric furnaces and may, for example, be made from carbon or ceramic particles. It is to be noted that the molding or forming of the articles does not absolutely require the exertion of pressure on or compression of the material in the mold. Rather, the molding or forming operation might be accomplished as a result of the vibrations alone or, if desired, by simultaneously vibrating and applying heat to the particulate material in the mold. On the other hand, the molding operation might be accomplished by the exertion of pressure or compression along or by simultaneous vibration and compression. Also, other than particulate materials might conceivably be so molded.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a fragmentary perspective view of an embodiment of the invention.

DESCRIPTION OF THE PREFERRED EMBODIMENTS

Referring now to the drawing, it is seen that the mold 8 includes a lower mold section 1, 2 and an upper mold section 4 which together define an internal mold cavity 7. The downwardly concave (with respect to a support for the mold) inner surface 3, 5 provided at the interior of the lower mold section 1, 2 extends over a portion of arc which is greater than 180° but substantially smaller than 360°. The upwardly concave (with respect to the aforementioned support) inner surface 6 provided on upper mold section 4 extends over the remaining portion of arc. Surfaces 3, 5, 6 together bound the mold cavity 7. Upper mold section 4 moves downwardly during the molding or forming operation, as indicated by arrow D.

Lower mold section 1, 2 comprises substantially upright wall portions 1, which are transversely spaced from one another, and a first transverse wall portion 2 which is provided with at least a part 5 of the downwardly concave surface 3, 5. Upper mold section 4 constitutes a second transverse wall portion which is provided with the upwardly concave surface 6.

Advantageously, the transverse wall portion 2 includes only the part 5 of the downwardly concave surface 3, 5. In this event, the upright wall portions 1 are each provided with a portion 3 of the remainder of this surface 3, 5. Under these circumstances, it is particularly advantageous, although by no means necessary, for these portions 3 to be equally divided between the two upright wall portions 1 and to be located directly opposite each other as shown. Another favorable construction is for the part 5 of downwardly concave surface 3, 5 to extend over an arc of 180° with the portion 3 being divided between the upright wall portions 1. However, it is to be clearly understood that the distributions and divisions of downwardly concave surface 3, 5 as described above are completely non-limiting. For example, mold 8 may be so designed that downwardly concave surface 3, 5 is provided, in its entirety, on transverse wall portion 2.

It is also advantageous for the first transverse wall portion 2 to be of one piece with the upright wall portions 1. However, transverse wall portion 2 may just as well be a discrete wall portion which is made fast with upright wall portions 1 by welding, brazing, soldering or other suitable means.

Referring again to the FIGURE, it is seen that in the exemplary embodiment the upright wall portions 1 comprise upper, lower and intermediate parts denoted by A, B and C, respectively. The thickness of upper part A is greater than that of intermediate part C which, in turn, has a greater thickness than lower part B. Intermediate parts C have lower ends E. First transverse wall portion 2, which is here shown as being provided with only the part 5 of downwardly concave surface 3, 5, extends from the respective lower ends E of intermediate parts C. Each of the intermediate parts C includes a portion 3 of the remainder of downwardly concave surface 3,5.

Thus, the invention provides an apparatus wherein articles may be molded without the formation of seams. This is a result of the shearing force produced at surfaces F during molding which will insure that no material which might produce a seam or flash adheres to the surfaces F. It then becomes possible to mold even round or cylindrical-shaped articles in a horizontally oriented mold without forming seams in the articles. Vibration of the mold will further enhance removal of any material which tends to adhere to surfaces F. In addition, the apparatus of the invention is simple and cheap to construct. The portions 3 of the remainder of downwardly concave surface 3, 5 may be formed, for example, by turning or trueing of upright wall portions 1.

It will be understood that each of the elements described above, or two or more together, may also find a useful application in other types of apparatus differing from the types described above.

While the invention has been illustrated and described as embodied in a molding apparatus, it is not intended to be limited to the details shown, since various modifications and structural changes may be made without departing in any way from the spirit of the present invention.

Without further analysis, the foregoing will so fully reveal the gist of the present invention that others can be applying current knowledge readily adpt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In an apparatus for vibration compacting of particulate materials, a mold comprising a lower mold section including two substantially upright transversely spaced wall portions each having a concave surface portion, and a transverse wall portion extending between said upright wall portions and being rigidly connected thereto and having a concave surface, said concave surface and said concave surface portions of said upright wall portions together forming a transition-less first forming surface extending over a portion of arc greater than 180°; and an upper mold section mounted between said upright wall portions for displacement with respect thereto between a retracted position in which the material to be compacted may be introduced into a space defined by said upright wall portions and said transverse wall portion, and a molding position, said upper mold section having a concave second forming surface extending over a portion of arc complementary to said portion of arc of said first forming surface and facing and defining with the latter a mold cavity having the shape of a desired article when said upper mold section is in said molding position thereof and bounded by the continuously merging first and second forming surfaces, whereby the article is uniformly compacted during the displacement of said upper mold section into said molding position thereof and a seamless exterior surface of the article is obtained when said upper mold section reaches said molding position thereof.

2. A mold as defined in claim 1, wherein said mold cavity is elongated.

3. A mold as defined in claim 1, wherein said mold cavity is cylindrical.

4. A mold as defined in claim 1, wherein said surface portions are equal and are located directly opposite each other.

5. A mold as defined in claim 1, said upright wall portions comprising upper, lower and intermediate parts, the thickness of said upper part being greater than that of said intermediate part and the thickness of said intermediate part being greater than that of said lower part, and said intermediate part having a lower end; and wherein said intermediate parts each comprise said surface portion and said first transverse wall portion extends from said lower ends.

6. A mold as defined in claim 1, wherein said transverse wall portion is of one piece with said upright wall portions.

7. A mold as defined in claim 1, wherein said concave surface extends over an arc of 180°, and each of said upright wall portions includes a surface portion of said first forming surface.

* * * * *